INVENTOR.
GEORGE W. KING
CLAYTON A. WASHBURN

BY H. L. Mackey

ATTORNEY.

TELEVISION COLOR MASKER

Filed Aug. 22, 1957 3 Sheets-Sheet 2

INVENTOR.
GEORGE W. KING
CLAYTON A. WASHBURN
BY H. S. Mackey
ATTORNEY.

INVENTOR.
GEORGE W. KING
CLAYTON A. WASHBURN
BY H. L. Mackey
ATTORNEY.

United States Patent Office 2,845,482

Patented July 29, 1958

2,845,482

TELEVISION COLOR MASKER

George W. King, Pleasantville, and Clayton A. Washburn, Thornwood, N. Y., assignors to General Precision Laboratory Incorporated, a corporation of New York Application August 22, 1957, Serial No. 679,581

7 Claims. (Cl. 178—5.4)

This invention relates to color television and more specifically to devices for correcting the color balance in television color cameras.

The term "color masker" as used in the televsion art refers to electrical circuit arrangements for improving the appearance of the colors in a color kinescope presentation by changing their hues and saturations for better representation of the televised object. Color maskers are useful and perhaps necessary in all television color camera chains and are particularly useful in televising color film.

In a color television camera, optical color filters separate the light received from the televised object into three beams of three primary hues. These optical filters are far from perfect, so that each filtered beam, composed nominally of colored light of a single primary color, actually contains, in addition to its nominal hue, some of each of the other two primary hues. When the object televised is a color motion picture film the color separation is even more imperfect because the primary color dyes in the film also have overlapping transmission bands. Finally, the phosphors or other components of the kinescope which convert electron beam energy into colored light also have overlapping bands of wavelengths.

In correcting these and other color differences a color masker must not introduce additional error. For example, when the televised object is neutral in color the kinescope picture must also be neutral at all brightness levels, and at all possible combinations of adjustments of the color masker. For present purposes neutral color means achromatic color or equal-signal white, and is color which has no perceptible hue, common terms being black, gray, white and silver. Since this result must be obtained at all brightness levels, the color masker must be preceded by gamma control components. An additional highly practical requirement of this invention is that each of the three hue adjustments be effected by a single physical control device which does not affect saturation, and that the saturations of each of the three primary color channels be effected by a single physical control device which does not affect hue. A further desirability is that the several physical controls operate simple electrical components. Finally it is desirable to include a single, simple control for varying the saturations of all three color channels simultaneously and equally, without at the same time affecting any hues thereof.

The color masker of the instant invention satisfies all of these requirements. The three gamma-corrected color channel electrical signals, representing primary colors such as, in accordance with current practice, red, green and blue, are applied to phase-splitting circuits so that in each channel two equal video signals of opposite instantaneous phase are secured. These are termed for convenience positive and negative signals. These terms are also appropriate because when the signals are combined in voltage divider circuits the combining operations are of the nature of additions and subtractions and provide signal analogies to the terms of algebraic equations forming the theoretical base of this invention.

The six phase-split signals are applied to a voltage-divider network having fifteen output terminals. These terminals are connected in three groups of five to three adding circuits, the three outputs of which, after amplification, constitute the color masker outputs.

The three color masker color channel outputs may be connected to a monitoring kinescope or may be transmitted by line or radio to the point at which the television signals are to be utilized.

The purpose of this invention is to provide a color masker circuit which may be adjusted to provide the most pleasing color picture as respects both the hues and saturations of the composite colors thereof.

A further purpose is to provide a color masker having separate hue and saturation controls in each color channel and also having a single means for simultaneously controlling the common saturation of all three primary color channels.

A better understanding of this invention may be secured from the detailed description together with the drawings, in which.

Figure 1:
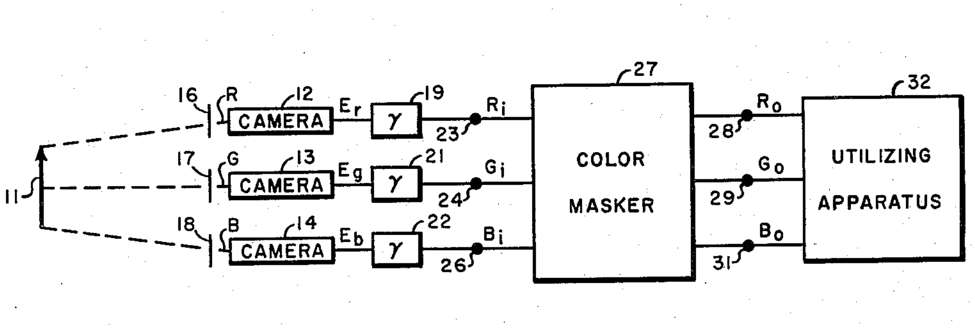
Figure 1 is a functional schematic diagram of a color television camera and associated equipment including the color masker of this invention.

Referring now to Fig. 1, a televised object 11 may be a "live" scene or a colored motion picture film. Light from this object is radiated in three beams and impressed on three television cameras 12, 13, and 14, each having an optical filter 16, 17 and 18 interposed between the object and the camera so that the light is segregated chromatically. The three primary colors presently used in color television systems are red, green and blue, and the three filters 16, 17 and 18 have their principal transmissions in the bands so named. The light beams thus presented to the three cameras 12, 13, and 14 represent at any instant and for any element of the object the analysis of its color in terms of these three primary colors. Each beam ideally consists of light having a single one of these three primary colors.

The television cameras 12, 13 and 14 emit electrical video signals which are termed the red, green and blue channel signals. These signals are gamma-corrected in conventional gamma-control amplifiers 19, 21 and 22 which are preferably set to linearize the color luminous transfer characteristics of the entire system including the kinescope screen. The gamma-corrected video voltages appearing at terminals 23, 24, and 26 each vary in amplitude in accordance with variations in the primary color amplitude at the object, and have magnitudes termed $R_i$, $G_i$, and $B_i$. The circuit up to this point is so designed that when the hue of the televised object element is neutral, these three signals are equal, or $$R_i = G_i = B_i \qquad (1)$$

These three signals are applied to the color masker 27 which constitutes the apparatus of this invention.

The color masker 27 has three output terminals 28, 29, and 31, at which the electrical signal amplitudes are termed $R_o$, $G_o$, and $B_o$. These color-masked video primary color signals are applied to utilizing apparatus 32. This utilizing apparatus may be, for example, a monitor containing a kinescope on which the television picture may be viewed, a transmission line a radio transmitter or other suitable utilizing apparatus. The three color video signals $R_o$, $G_o$, and $B_o$ may be used directly or they may first be applied to an encoder for conversion into other color signals before final use.

Figure 2:
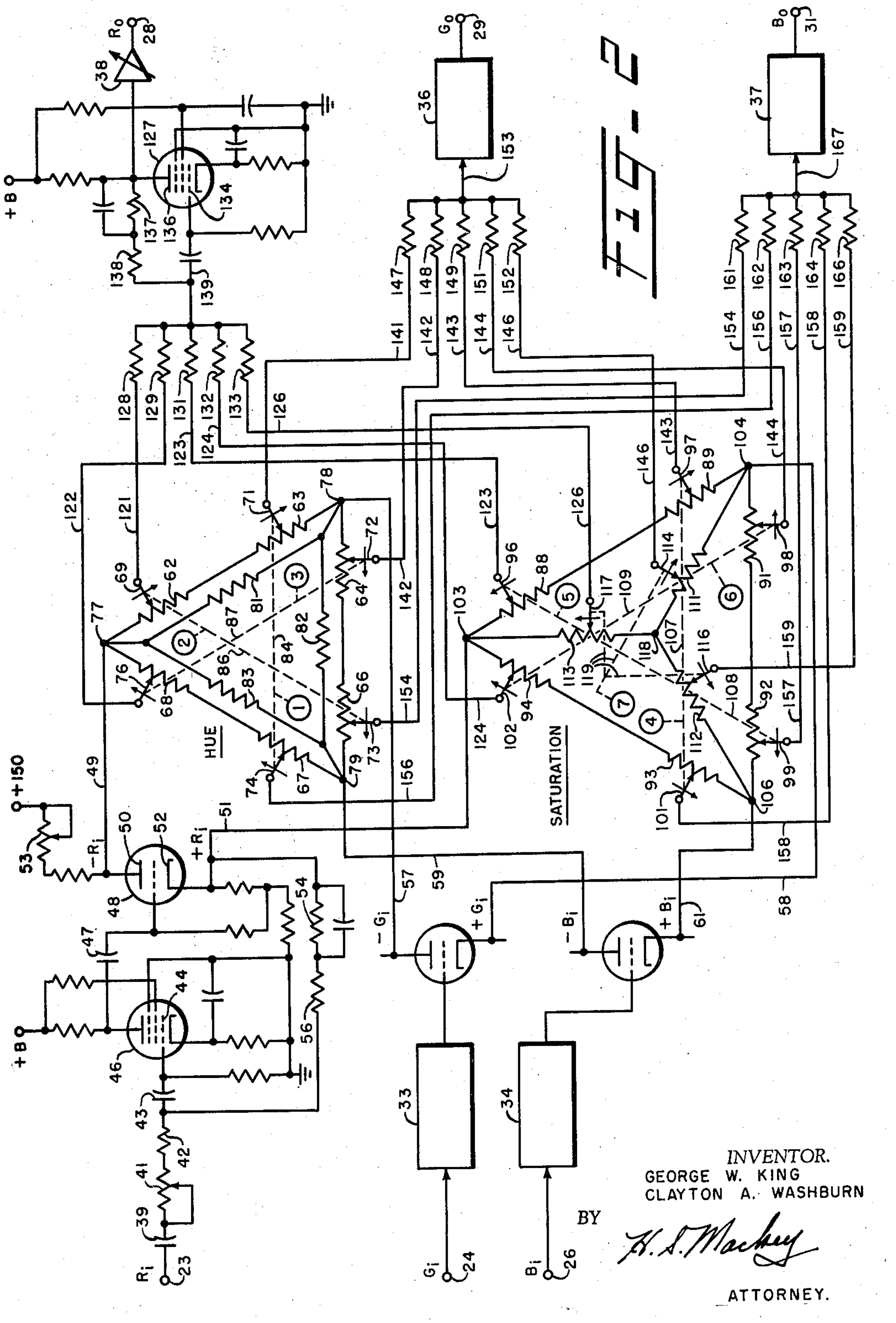
Figure 2 is a schematic diagram of the color masker of this invention.

The circuit of color masker 27, together with its input and output terminals, is depicted in Fig. 2. The input terminals 23, 24 and 26 are connected to input amplifying and phase-splitting circuits which are identical in the three color signal channels, so that only the red channel is depicted in detail while the green and blue signal channel circuits are merely indicated by rectangles 33 and 34. The three sets of amplifying and phase-splitting circuits are connected to resistor and voltage divider networks common to all channels, while their outputs are applied to adding circuits, each consisting of a resistor network and adding amplifier. The resistor networks are depicted in full but since all three adding amplifiers are identical the red channel adding amplifier only is drawn in detail with the green and blue channel amplifiers depicted only by rectangles 36 and 37. These rectangles also include additional amplifiers indicated in the red channel by symbol 38. The outputs of these final amplifiers constitute the final output terminals 28, 29, and 31 of the color masker.

The red channel input terminal 23 is coupled through a capacitor 39 to a gain control rheostat 41 adjusted at the time of installation. Rheostat 41 is coupled through a resistor 42 and capacitor 43 to the control grid 44 of a pentode amplifier 46 which, without feedback, would have a high gain. Amplifier 46 in turn is coupled through a capacitor 47 to a triode phase splitter 48 whose output obtained respectively from its anode 50 and cathode 52 is applied to conductors 49 and 51. Triode 48 is provided with a rheostat 53 in its anode supply circuit as an installation adjustment to secure equal anode and cathode output signals. The cathode 52 is connected through a shunted resistor 54 and resistor 56 to the grid circuit of the pentode 46, producing a large negative feedback and reducing the pentode stage gain to about 4.

It is important that the triode cathode circuit present a low impedance to its output conductor 51, for the lower this impedance the lower will be the "crosstalk" or inadvertent intermixing between channels in the common voltage divider part of this color masker. The negative feedback circuit effectively accomplishes the result by reducing the cathode output impedance for low video frequencies, below about 1 mc. p. s., from a value it would have without the feedback circuit of about 150 ohms to a value with the feedback circuit of about 10 ohms.

The similar output anode and cathode conductors of the green channel phase splitter are designated 57 and 58 and of the blue phase splitter 59 and 61.

Fifteen voltage dividers are assembled in two triangular networks and one Y network. Their adjustment knobs are ganged, twelve being ganged in pairs and the remaining three being ganged together as one unit. The inputs to one triangular network, termed the hue network, are derived from the three phase splitter anodes and applied to the three apexes of the triangle. The inputs to the other triangular network, termed the saturation network, are derived from the three phase splitter cathodes and applied to its three apexes. The Y network consists of three potential dividers ganged together and with the three arms of the Y connected to the three apexes of the saturation triangle network. The center of the Y is left unconnected and floating.

The hue voltage divider network includes six voltage dividers 62, 63, 64, 66, 67 and 68 connected in a closed ring or triangle with two dividers connected in series forming each side of the triangle. Dividers 63 and 67, 62 and 66, 64 and 68 are respectively ganged together for respective common actuation of their sliders. The directions of motions of the sliders when the divider gang knobs are turned clockwise are indicated by lateral arrows on the slider symbols 69, 71, 72, 73, 74, and 76. This network is characterized by the fact that all of these lateral arrows on the schematic diagram point in the same clockwise rotational direction around the closed voltage divider ring. The junction 77 located between dividers 62 and 68 constitutes the apex connected to the anode output conductor 49 of the red phase splitter triode 48 and is termed the red hue apex. Similarly the green hue apex 78 junction located between dividers 63 and 64 is connected to the anode output conductor 57 of the green phase splitter and the blue hue apex 79 junction located between dividers 66 and 67 is connected to the anode output conductor 59 of the blue phase splitter.

Dividers 62 and 63 are shunted by a fixed resistor 81, dividers 64 and 66 are shunted by a fixed resistor 82, and dividers 67 and 68 are shunted by a fixed resistor 83. The function of these three resistors 81, 82 and 83 is to help to equalize the impedance of this triangular network compared with the joint input impedance of the other two networks. The six sliders of the hue triangle constitute its six electrical output terminals. Sliders 71 and 74 are mechanically interconnected for conjoint operation as indicated by a dashed line 84. The numeral "1" inscribed in a circle adjacent line 84 designates the common operating knob. Similarly, dashed line 86 designates the mechanical interconnection of dividers 66 and 62 conjointly operated by the common knob 2, and dashed line 87 designates the mechanical interconnection of dividers 64 and 68, conjointly operated by the common knob "3."

The triangular saturation voltage divider network consists of six voltage dividers 88, 89, 91, 92, 93, and 94, connected in a closed ring or triangle, the respective voltage dividers being provided with the sliders 96, 97, 98, 99, 101, and 102. The red apex junction 103 located between the dividers 88 and 94 is connected to the cathode terminal conductor 51 of the red phase splitter. The green apex junction 104 located between dividers 89 and 91 is connected to the cathode terminal conductor 58 of the green phase splitter. The blue apex junction 106 located between dividers 92 and 93 is connected to the cathode terminal conductor 61 of the blue phase splitter. The six sliders constitute the six electrical output terminals of this network, and are ganged in pairs for conjoint operation. Sliders 97 and 101 are mechanically interconnected as indicated by dashed line 107, sliders 96 and 99 are mechanically interconnected as indicated by dashed line 108, and sliders 98 and 102 are mechanically interconnected as indicated by dashed line 109. Adjacent the dashed lines 107, 108, and 109 the numerals 4, 5, and 6 inscribed in circles designate the respective operating knobs.

The triangular saturation network is characterized by the directions of electrical change of its voltage dividers. These directions for clockwise physical rotation are indicated in Fig. 2 by lateral arrows on the slider symbols. Progressing in this schematic diagram clockwise around the triangle, successive divider movements are opposite. This characterization is different from that of the hue triangle, and this difference distinguishes these two triangular networks from each other.

Figure 3:
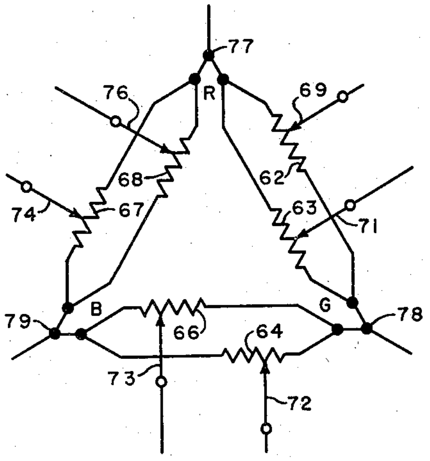
Figure 3 is a diagram of an alternative arrangement of the delta networks of the color masker.

All 12 voltage dividers comprising the hue and saturation triangular networks are equal in resistance and each may, for example, have a resistance of 1000 ohms. This value, however, may be different and should be selected in accordance with load, impedance and accuracy considerations. Since each voltage divider adjustment covers only one-half of the total resistance of its side of the triangle, its effect is limited. The adjustment ranges can be further restricted, if desired, by inserting a fixed resistor in series with each voltage divider. On the other hand the ranges can be increased to maximum by connecting each voltage divider directly between its two color channel input points. This modification is depicted in Fig. 3, in which the six hue triangle voltage dividers and their sliders bear the same reference characters as the like elements in Fig. 2.

The Y master saturation network consists of three voltage dividers 111, 112 and 113, Fig. 2, each having respective sliders 114, 116 and 117. The dividers are connected in Y with the remote ends of their resistance elements connected to the apexes of the saturation triangle. Thus divider 111 is connected to green apex junction 104, divider 112 is connected to blue apex junction 106 and divider 113 is connected to red apex junction 103. The other ends of the dividers are joined together at junction 118 which is left floating. The Y network electrical has three outputs obtained from the sliders 114, 116, and 117. All three sliders are mechanically interconnected for conjoint operation, as indicated by the dashed lines 119, by a common operating knob 7.

The master saturation network may alternatively be in the form of a triangular network having the same input and output impedance characteristics as the described Y network. It is highly desirable to operate the master saturation network from the phase splitter cathodes as shown because the master saturation network is highly sensitive to cross coupling among the input signals. When fed from the phase splitter cathodes the input impedance is negligibly low relative to the equal resistances of the dividers 111, 112 and 113 and very little input signal intermixing can take place. It is also desirable although not essential to associate the master saturation Y network with the saturation triangular network rather than with the hue network.

The 15 sliders of the 15 voltage dividers constitute the output terminals of the three networks. These 15 terminals are divided into three groups. The first, designated the red group, consists of the two sliders 69 and 76 of the hue network adjacent to the red apex 77, the two sliders 96 and 102 of the saturation network adjacent to its red apex 103, and the single slider 117 of the master saturation Y network adjacent to the red input junction 103. Similarly the five sliders 71, 72, 97, 98, and 114 constitute the green group and five sliders 73, 74, 99, 101, and 116 constitute the blue group.

The five sliders of the red group are connected through conductors 121, 122, 123, 124, and 126 to an adding circuit. This circuit comprises a resistor network composed of resistors 128, 129, 131, 132, and 133 and a pentode amplifier tube 127. The resistors 128, 129, 131, 132 and 133 each have one end connected to respective ones of conductors 121, 122, 123, 124, and 126 and the other ends of the resistors are connected together and to control grid 134 of tube 127. This adding circuit is designed to have a transmission frequency band extending from about 20 C. P. S. to about 10 mc. p. s., or about twice the width of the video frequency band it is required to pass, which has the limits of 20 C. P. S. and 4½ mc. p. s. The amplifier 127 is provided with a negative feedback circuit consisting of bypassed resistor 137 and unbypassed resistor 138 connected between the anode 136 and the input conductor 139 in order to secure the desired flat band characteristic.

The anode 136 of the pentode 127 is connected through adjustable gain amplifier 38 to the red output terminal 28. The amplifier 38, as well as the input amplifier 46, the phase splitter circuit and the voltage divider circuits, uniformly transmits all frequencies between 20 C. P. S. and 4½ mc. p. s. and the transmission is not markedly attenuated for any frequencies below 9 or 10 mc. p. s.

It will be noted that all five of the voltage divider sliders connected to the red adding circuit constitute those sliders nearest to the two red input terminals of the voltage divider networks. Similarly the five sliders nearest the two green input terminals constitute the output terminals to the green adding circuit, and the five sliders nearest the two blue input terminals constitute the output terminal to the blue adding circuit. Specifically, sliders 71, 72, 97, 98, and 114 are connected through conductors 141, 142, 143, 144, and 146 to resistors 147, 148, 149, 151 and 152 respectively. The other ends of these resistors are connected together and to conductor 153 constituting the input conductor of an adding amplifier and following adjustable gain amplifier which are indicated by rectangle 36 and which are in all respects the same as the corresponding elements of the red channel.

Similarly the five sliders 73, 74, 99, 101, and 116 are connected through conductors 154, 156, 157, 158, and 159 to resistors 161, 162, 163, 164, and 166 respectively. The other ends of these resistors are connected together and to the input 167 of the blue adding circuit amplifier and adjustable gain amplifier designated by rectangular 37 similar to the corresponding elements of the red and green channels.

The following set of equations sets forth the desired relationship between the input signals applied to the color masker and the output signals obtained therefrom.

$$\begin{aligned} R_o &= a_{11}R_i + a_{12}G_i + a_{13}B_i \\ G_o &= a_{21}R_i + a_{22}G_i + a_{23}B_i \\ B_o &= a_{31}R_i + a_{32}G_i + a_{33}B_i \end{aligned} \quad (2)$$

As heretofore stated, $R_i$, $G_i$ and $B_i$ represent the strengths of three electrical video signals applied to the input terminals of the red, green and blue channels of the color masker, and $R_o$, $G_o$ and $B_o$ represent the strengths of the electrical output signals at the color masker output terminals. The coefficients, such as $a_{11}$, $a_{12}$ . . . $a_{33}$ represent amplitudes of the electrical color data signals present within the color masker in accordance with the adjustments of the fifteen voltage dividers. It is obvious that both hue and saturation of an output color signal, such as $R_o$, depend not only on the quantity of the "pure" red input signal but also on the amounts and relative amounts of admixed green and blue signals.

A limitation placed by the color television art on these general equations is that when the three input signals are equal, their sum will give neutral hue (white). A further requirement follows from the desirability, before stated, that the color masker not degrade signals applied to it. For example, if the composite video signal applied to the color masker is neutral, then at any and all settings and combinations of settings of the seven color masker knobs the output picture which results from the three output electrical signals $R_o$, $G_o$, and $B_o$ must be neutral in hue. In order for this to be true the coefficients of Equation 1 must always have the following relationships:

$$\begin{aligned} a_{11}+a_{12}+a_{13} &= 1 \\ a_{21}+a_{22}+a_{23} &= 1 \\ a_{31}+a_{32}+a_{33} &= 1 \end{aligned} \quad (3)$$

By substituting these identities in (2) after algebraic manipulation there is obtained:

$$\begin{aligned} R_o &= R_i + a_{12}(G_i - R_i) + a_{13}(B_i - R_i) \\ G_o &= G_i + a_{21}(R_i - G_i) + a_{23}(B_i - G_i) \\ B_o &= B_i + a_{31}(R_i - B_i) + a_{32}(G_i - B_i) \end{aligned} \quad (4)$$

These Equations 4 have no physical significance except that which can be attributed by referring to the preceding Equations 2 and 3. However, a start toward physical relevance can be made and it can thereafter be demonstrated that a mathematical description of the networks of the invention has the form of these Equations 4.

Figure 4:
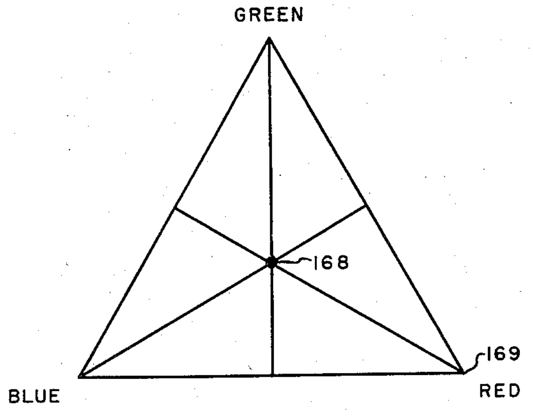
Figure 4 is the Maxwell trichromatic diagram.

A Maxwell chart depicted in Fig. 4 has the three primary colors green, red and blue at the apexes of a triangle. Nearly any hue and saturation may be represented by a point within this triangle. Neutral is represented by the central point 168 at which the three bisecting lines meet. The color along the line 169—168 drawn from red apex to the neutral point has the pure red hue but has a saturation which decreases from a maximum at 169 to zero at 168. Progression along the line 169—168 therefore represents the admixture to red of green and blue in exactly equal amounts. Admixture of green and blue in unequal amounts is represented by progression along some other line, and constitutes change of hue together with decrease of saturation.

The first or red equation of Equations 4 has three terms, the second and third of which represent combinations of the red input signal with each of the other input signals. These second and third terms represent green and blue admixtures in the red channel and therefore in accordance with the preceding explanation in general modify both the hue and saturation of the input signal. In the circuits previously described the two delta networks control the outputs in accordance with the second and third terms, $a_{12}$, $(G_i-R_i)$ and $a_{13}$ $(B_i-R_i)$, while the Y master saturation network controls the outputs in accordance with the first term, $R_i$ plus specific admixtures of the other input signals. This statement also applies to the second and third equations of the equation group 4. When the master saturation control is turned fully clockwise signals representing the first terms, $R_i$, $G_i$ and $B_i$ of these equations are applied at full strength to the adding networks, and the Equations 4 apply exactly. However, at any other setting of voltage divider knob 7 this statement is not exactly true and the outputs from the Y network contain admixtures of the other signals.

A general form of the term which may be substituted for each of these terms to represent saturation changes effected by the master saturation control is $$a_{14}R_i+a_{15}(G_i+B_i) \qquad (5)$$

Equations 4 then become $$\begin{aligned} R_o&=a_{14}R_i+a_{15}(G_i+B_i)+a_{12}(G_i-R_i)+a_{13}(B_i-R_i)\\ G_o&=a_{24}G_i+a_{25}(R_i+B_i)+a_{21}(R_i-G_i)+a_{23}(B_i-G_i) \qquad (6)\\ B_o&=a_{34}B_i+a_{35}(R_i+G_i)+a_{31}(R_i-B_i)+a_{32}(G_i-B_i) \end{aligned}$$

In each of these equations of group 6 the first two of the four terms on the right generally indicate saturation changes and the last two indicate both hue and saturation changes. The coefficients $a_{14}$, $a_{15}$, $a_{24}$, $a_{25}$, $a_{34}$ and $a_{35}$ represent amplitudes of the electrical color data signals present within the color masker in accordance with adjustments of the Y network.

The three adjustable networks of Fig. 2 instrument these Equations 6. The two delta networks together instrument the last two terms of each of the equations. These delta networks are partly redrawn in Fig. 5. The same red, green and blue electrical input signals are applied to the three apexes of each triangle but are of opposite phases in the two triangles or deltas. Those signals applied to the hue delta are therefore termed for convenience negative and those applied to the saturation delta are termed positive. This terminology permits analogies to be drawn between the phases of the signals and the signs of the mathemathical terms representing the signals. The four sliders nearest the red apexes 77 and 103 constitute the red output terminals, and the four conductors connected to them all go to the red adding network. Similarly, the four sliders nearest the green apexes constitute the green output terminals and the four nearest the blue apexes the blue outputs. Mechanically, the three controls of the hue delta control hue without affecting saturation, and the three controls of the saturation delta control saturation of the individual color channels respectively without affecting hue.

Figure 5:
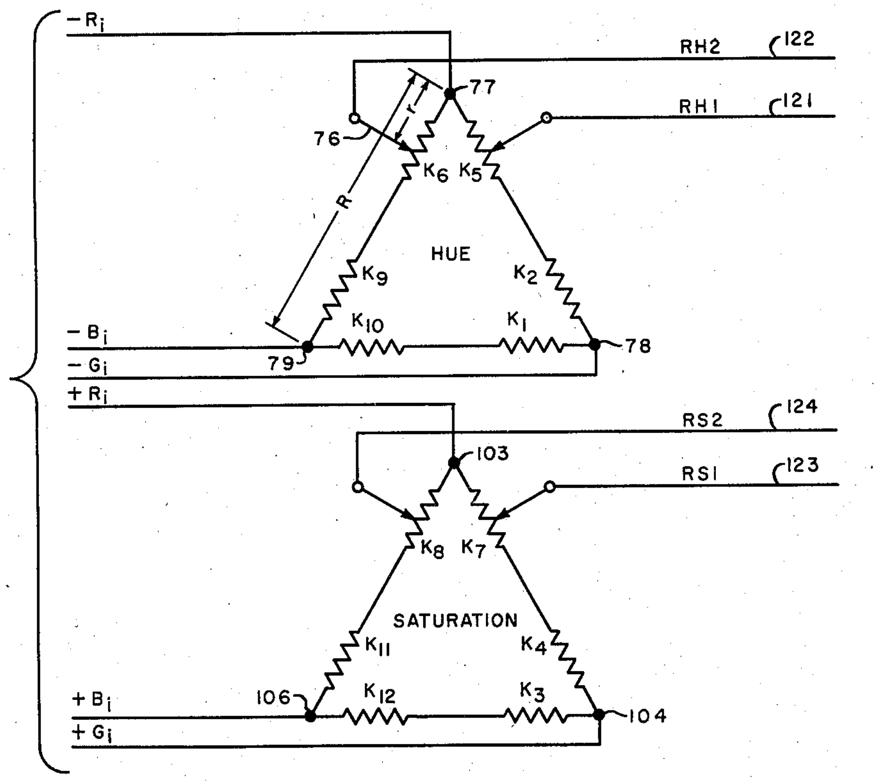
Figures 5 and 6 depict details of the two delta and one Y network of the color masker.

All 12 resistors composing the two deltas have the same resistance, as before stated. In order to identify each slider position in non-dimensional terms, let R be defined as the resistance of one side of a delta, composed of two resistors in series, and let $r$ be defined as the resistance from a slider to the nearest apex. The ratio $$\frac{r}{R}$$

is termed K with a subscript denoting a specific slider position. The several slider positions are thus distinguished and marked as $K_5$, $K_6$, $K_7$ and $K_8$ in Fig. 5. The same definition of the value of K holds for $K_2$, $K_1$, $K_{10}$, $K_9$, $K_4$, $K_3$, $K_{12}$ and $K_{11}$, which are the slider non-dimensional resistance values of voltage dividers 63, 64, 66, 67, 89, 91, 92 and 93 respectively as shown in Figs. 2 and 5.

If, in the hue delta, a video signal representing pure red hue be applied to input terminal 77, and another video signal representing pure blue hue be applied to terminal 79, then there will appear at slider 76 a composite signal containing both input signals in reduced amounts. The amount of red signal will be $$-(1-K_6)R_i,$$

and of blue $-K_6B_i$. The total signal is then the sum or $$RH2=-[K_6B_i+(1-K_6)R_i] \qquad (7)$$

Similarly $$\begin{aligned} RH1&=-[K_5G_i+(1-K_5)R_i] &(8)\\ RS2&=-K_8B_i+(1-K_8)R_i &(9)\\ RS1&=-K_7G_i+(1-K_7)R_i &(10) \end{aligned}$$

In the adding circuit these terms (7), (8), (9) and (10) are added, and the sum is the output signal $R_o$ except that the master saturation term is absent. Call this partial sum $\Delta R_o$. Then, collecting terms $$\Delta R_o=(K_8-K_6)(B_i-R_i)+(K_7-K_5)(G_i-R_i) \qquad (11)$$

Similarly, the partial green and blue output signals are $$\begin{aligned} \Delta G_o&=(K_4-K_2)(R_i-G_i)+(K_3-K_1)(B_i-G_i) &(12)\\ \Delta B_o&=(K_{12}-K_{10})(G_i-B_i)+(K_{11}-K_9)(R_i-B_i) &(13) \end{aligned}$$

Inspection of these equations reveals that the right sides thereof have the same form as the last two terms of each of the three equations of group 6.

Figure 6:
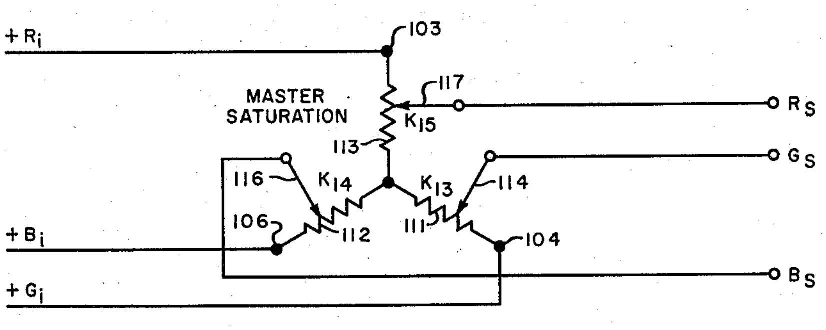

The Y network of Fig. 2 is reproduced in Fig. 6. This network instruments the first two terms on the right of each of Equations 6. The three resistors 113, 111 and 112 have equal resistances, each having a value termed R. Inputs are applied to the terminals 103, 104 and 106, and outputs are derived from the sliders 117, 114 and 116. For example, the master saturation output signal applied to the red adding circuit as one component input thereof is secured from slider 117 which is the slider nearest the $R_i$ terminal. This output may be termed $R_s$. The resistance presented to input signal $R_i$ applied to terminal 103 is the resistance R of resistor 113 plus the resistance of the two resistors 111 and 112 which are effectively in parallel for this input, or a total of $\frac{3}{2}$R. Call $r$ the resistance between slider 117 and terminal 103 and define K as $$\frac{r}{R}$$

Then, by an analysis similar to that described for the delta networks, the red component of the output $R_s$, termed $R_R$, is $$R_R=(1-\tfrac{2}{3}K_{15})R_i \qquad (14)$$

Similarly the $G_i$ component, $R_G$, in $R_s$ is $$R_G=\tfrac{1}{3}K_{15}G_i \qquad (15)$$

The $B_i$ component, $R_B$, in $R_s$ is $$R_B=\tfrac{1}{3}K_{15}B_i \qquad (16)$$

The total output signal $R_s$ at slider 117 is $$R_s=(1-\tfrac{2}{3}K_{15})R_i+\tfrac{1}{3}K_{15}(B_i+G_i) \qquad (17)$$

Similarly the signal $G_s$ from slider 114 and $B_s$ from slider 116 are $$\begin{aligned} G_s&=(1-\tfrac{2}{3}K_{13})G_i+\tfrac{1}{3}K_{13}(R_i+B_i) &(18)\\ B_s&=(1-\tfrac{2}{3}K_{14})B_i+\tfrac{1}{3}K_{14}(R_i+G_i) &(19) \end{aligned}$$

The combinations of these master saturation signals (17), (18) and (19) with signals (11), (12) and (13) are $$R_o=(1\tfrac{2}{3}K_{15})R_i+\tfrac{1}{3}K_{15}(B_i+G_i)+(K_8-K_6)(B_i-R_i)+(K_7-K_5)(G_i-R_i) \quad (20)$$
$$G_o=(1\tfrac{2}{3}K_{13})G_i+\tfrac{1}{3}K_{13}(R_i+B_i)+(K_4-K_2)(R_i-G_i)+(K_3-K_1)(B_i-G_i)$$
$$B_o=(1\tfrac{2}{3}K_{14})B_i+\tfrac{1}{3}K_{14}(R_i+G_i)+(K_{12}-K_{10})(G_i-B_i)+(K_{11}-K_9)(R_i-B_i)$$

These equations can if desired be further simplified because the values of some of the K coefficients are alike and because the voltage dividers which they represent are ganged and move in the same sense. These equations imply that the source impedance is zero and the adder resistors have infinite resistances. Thus Equations 20 represent an ideal condition. However, actual conditions approach the ideal sufficiently closely that for all practical purposes the Equations 20 represent the facts.

It will be noted that these Equations 20 have the same form as the Equations 6, for if coefficient $(1\tfrac{2}{3}K_{15})$ be substituted for $a_{14}$, $(K_8-K_6)$ be substituted for $a_{13}$, etc., they become identical. Equations 6 state what it is desired that the color masker accomplish, and Equations 20 describe what the color masker as designed does accomplish. The similarity of these equations demonstrates that the color masker accomplishes what is intended. This is however, only part of the results produced by the color masker. Perhaps its most important accomplishment resides in the fact that while it provides flexible electrical color masking controls it groups the mechanical connections in such a way that hues are adjustable without affecting saturations, and vice versa.

An analysis of Equation 20 shows that the color masker does not distort neutral color channel signals, for in the master saturation terms, if $K_{13}$, $K_{14}$ and $K_{15}$ be made zero, corresponding to positions of sliders 117, 114 and 116 adjacent to their respective apexes, these terms become the $R_i$, $G_i$ and $B_i$ term of Equations 4. If then the three input signals $R_i$, $G_i$ and $B_i$ be made equal, the last two terms of each of Equations 20 become zero, and $R_o=R_i$, $G_o=G_i$ and $B_o=B_i$ at all adjustments of all other voltage dividers. That is to say that when signals representing neutral hue are applied, the output signals also represent neutral hue at all adjustments.

Before the color masker is employed, it must be adjusted so as to secure these described results. Signal gains through the input amplifier and phase splitter must be identical in all three channels. In each phase splitter the anode output signal must equal the cathode output signal in amplitude. The three color sets of hue and saturation knobs 1 to 6, Fig. 2, must be adjusted so that the mechanical center position corresponds to the electrical center position. There must be neither amplification nor attenuation of signal within the color masker. That is, each channel must have unity gain.

These adjustments must be made in the order given. The detailed procedure is as follows. Connect all three input terminals 23, 24 and 26 together and apply a test signal having a frequency between 1 and 10 k. c. p. s. and having a peak-to-peak amplitude of 0.7 volt. Set the hue controls 1, 2 and 3 and the individual color saturation controls 4, 5 and 6 at their mechanical center positions. Set the master saturation control at its extreme clockwise position to place sliders 114, 116 and 117 at their respective apex limit positions. Set the red input gain control 41 and the corresponding green and blue channel gain controls so that the signal at the cathode 52 of the red channel phase splitter triode 48 and the corresponding cathode electrode signals in the green and blue channels are all alike. Next, adjust the anode balance control 53 in the red channel so that the signal at the anode conductor 49 has the same amplitude as the signal at the cathode conductor 51. Make similar adjustments in the green and blue channels.

Now remove the input signal and remove the connection between the three red, green and blue input terminals. Apply the input signal to the red channel input terminal 23 alone, leaving the green and blue terminals 24 and 26 open and unconnected. Change the red hue knob 1 and red saturation knob 4 until potentials at the green output terminal 29 and blue output terminal 31 with respect to ground are zero. This should require little if any movement of these knobs from their mechanical center positions. These knobs are now electrically centered. Loosen and reset these knobs with their pointers at their mechanical centers which will then coincide with their electrical center positions. Repeat for the other channels. Applying the test signal to the red input terminal 23, adjust the output amplifier 38 until the output at terminal 28 indicates unity gain in the entire red channel within the color masker. Repeat for the green and blue channels. The color masker is now in proper adjustment for use.

While in the above description the potentials applied to the hue network are shown and described as derived from the anode circuits of the phase splitter and those applied to the saturation network are derived from the cathode circuit since such an arrangement is preferred as producing the least "crosstalk," nevertheless in some arrangements it may be desired to interchange these connections.

What is claimed is:

1. A television color masker adapted to have impressed thereon three video signals each of which is representative of a respective one of the composite colors of a televised object comprising, a phase splitter circuit for each of said video signals each of which has a respective one of said video signals impressed thereon and produces therefrom a pair of output signals of equal magnitude with one of the output signals of each pair being opposed in phase to that of the other of the pair, a first closed delta circuit each arm of which includes a pair of potentiometers each provided with an adjustable slider, each apex junction of said first delta circuit having like phased ones of each of the pairs of phase splitter output signals impressed thereon, a second delta circuit each arm of which includes a pair of potentiometers each provided with an adjustable slider, each apex junction of said second delta circuit having a respective one of the others of each of said pairs of phase splitter output signals impressed thereon, a Y circuit each arm of which includes a potentiometer each provided with an adjustable slider, each of the noncommon ends of said Y circuit potentiometers having a respective one of the others of each of said pairs of phase splitter output signals impressed thereon, an output channel for each of the composite colors, an adding circuit inserted in and connected to each output channel, each respective adding circuit having impressed on its input the potentials of the sliders of the first and second delta circuits which are adjacent the respective apex junctions to which one or the other of the pair of output signals of a particular phase splitter is applied and the potential of the slider of the respective potentiometer of said Y circuit to whose noncommon end the one of said pairs of output signals of a particular phase splitter is applied, the sliders of said Y circuit potentiometer being mechanically interconnected for common control and electrically diametrically opposed sliders of the potentiometers of said delta circuits being connected for conjoint operation in pairs.

2. A television color masker adapter to have impressed thereon three video signals each of which is representative of a respective one of the composite colors of a televised object comprising, a phase splitter circuit for each of said video signals each of which has a respective one of said video signals impressed thereon and produces therefrom a pair of output signals of equal magnitude with one of the output signals of each pair being opposed in phase to that of the other of the pair, a first closed delta circuit each arm of which includes a pair of potentiometers connected in series, each potentiometer being provided with an adjustable slider, each apex junctions of said first delta circuit having like phased ones of each of the pairs of phase splitter output signals impressed thereon, a second delta circuit each arm of which includes a pair of potentiometers connected in series, each potentiometer being provided with an adjustable slider, each apex junction of said second delta circuit having a respective one of the others of each of said pairs of phase splitter output signals impressed thereon, a Y circuit each arm of which includes a potentiometer each provided with an adjustable slider, the noncommon ends of said Y circuit potentiometers being respectively connected to the respective apex junction of said second delta circuit, an output channel for each of the composite colors, an adding circuit inserted in and connected to each output channel, each respective adding circuit having impressed on its input the potentials of the sliders of the first and second delta circuit which are adjacent the respective apex junctions to which one or the other of the pair of output signals of a particular phase splitter is applied and the potential of the slider of the respective potentiometer of said Y circuit connected to the respective apex junction of said second delta circuit, the sliders of said Y circuit potentiometers being mechanically interconnected for common control and electrically diametrically opposed sliders of the potentiometers of said delta circuits being connected for conjoint operation in pairs.

3. A television color masker adapted to have impressed thereon three video signals each of which is representative of a respective one of the composite colors of a televised object comprising, a phase splitter circuit for each of said video signals each of which has a respective one of said video signals impressed thereon and each of which includes a tube having cathode and anode output circuits producing output signals of equal magnitude but opposite phase, a first closed delta circuit each arm of which includes a pair of potentiometers each provided with an adjustable slider, each apex junction of said first delta circuit being connected to an anode output circuit of a respective phase splitter, a second closed delta circuit each arm of which includes a pair of potentiometers each provided with an adjustable slider, each apex junction of said second delta circuit being connected to a cathode output circuit of a respective phase splitter, a Y circuit each arm of which includes a potentiometer each provided with an adjustable slider, each of the noncommon ends of said respective Y circuit potentiometers being connected to respective like ones of the respective phase splitter outputs, an output channel for each of the composite colors, an adding circuit inserted in and connected to each output channel, each respective adding circuit having impressed on its input the potentials of the sliders of the first and second delta circuits which are adjacent the respective apex junctions to which one or the other output of a particular phase splitter is applied and the potential of the slider of the respective potentiometer of said Y circuit to whose noncommon end the output of a particular phase splitter is applied, the sliders of said Y circuit potentiometers being mechanically interconnected for common control and electrically diametrically opposed sliders of the potentiometers of said delta circuits being connected for conjoint operation in pairs.

4. A television color masker adapted to have impressed thereon three video signals each of which is representative of a respective one of the composite colors of a televised object comprising a phase splitter circuit for each of said video signals each of which has a respective one of said video signals impressed thereon and each of which includes a tube having cathode and anode output circuits producing output signals of equal magnitude but opposite phase, a first closed delta circuit each arm of which includes a pair of potentiometers connected in series, each potentiometer being provided with an adjustable slider, each apex junction of said first delta circuit being connected to an anode output circuit of a respective phase splitter, a second delta circuit each arm of which includes a pair of potentiometers connected in series, each potentiometer being provided with an adjustable slider, each apex junction of said second delta circuit being connected to a cathode output circuit of a respective phase splitter, a Y circuit each arm of which includes a potentiometer each provided with an adjustable slider, the noncommon ends of said Y circuit potentiometers being respectively connected to the respective apex junctions of said second delta circuit, an output channel for each of said composite colors, an adding circuit inserted in and connected to each output channel, each respective adding circuit having impressed on its input the potentials of the sliders of the first and second delta circuits which are adjacent the respective junctions to which one or the other output of a particular phase splitter is applied and the potential of the slider of the respective potentiometer of said Y circuit connected to the respective apex junction of said second delta circuit, the sliders of said Y circuit potentiometers being mechanically interconnected for common control in the same direction, electrically diametrically opposed sliders of the potentiometers of said first delta circuit being connected for conjoint operation in pairs in the same direction and electrically diametrically opposed sliders of the potentiometers of said second delta circuit being connected for conjoint operation in pairs in opposite directions.

5. A televiison color masker for correcting the colors in separate red, green, and blue signal channels of a color television system comprising, means individual to each channel for producing therefrom a pair of color output signals of equal amplitude but opposite phase, each pair of signals corresponding in color to the channel from which they are derived, a first closed delta circuit each arm of which includes a pair of potentiometers connected in series, each potentiometer being provided with an adjustable slider electrically diametrically opposed pair of which are interconnected for conjoint operation in the same direction each individual apex junction of said first delta circuit having a different color but like phased color output signal impressed thereon, a second closed delta circuit each arm of which includes a pair of potentiometers connected in series, each potentiometer being provided with an adjustable slider electrically diametrically opposed pairs of which are interconnected for conjoint operation in opposite directions each individual apex junction of said second delta circuit having impressed thereon a different color output signal opposite in phase to those impressed on said first delta circuit, a Y circuit each arm of which includes a potentiometer each of which is provided with an adjustable slider connected for conjoint operation in the same direction, each of the noncommon ends of said respective Y circuit potentiometer having a different color but like phased color output signal impressed thereon, a first adding circuit summing the potentials of the sliders of the potentiometers electrically adjacent those apex junctions of said first and second delta circuits on which the red color output signals are impressed and the potential of the slider of the potentiometer of the Y circuit on whose noncommon end a red color output signal is impressed, a red corrected output channel connected to the output of said first adding circuit, a second adding circuit summing the potentials of the sliders of the potentiometers electrically adjacent those apex junctions of said first and second delta circuits on which a green color output signal is impressed and the potential of the slider of the potentiometer of the Y circuit on whose uncommon end a green color output signal is impressed, a green corrected output channel connected to the output of said second adding circuit, a third adding circuit summing the potentials of the sliders of the potentiometers electrically adjacent those apex junctions of said first and second delta circuits on which the blue color output signals are impressed and the potential of the slider of the potentiometer of the Y circuit on whose noncommon end a blue color output signal is impressed, and a blue corrected output channel conected to the output of said third adding circuit.

6. A television color masker adapted to have impressed thereon three video signals each of which is representative of a respective one of the composite colors of a televised object comprising, a phase splitter circuit for each of said video signals each of which has a respective one of said video signals impressed thereon and produces therefrom a pair of output signals of equal magnitude with one of the output signals of each pair being opposed in phase to that of the other of the pair, a first closed delta circuit each arm of which includes a pair of potentiometers each provided with an adjustable slider, each apex junction of said first delta circuit having like phased ones of each of the pairs of phase splitter output signals impressed thereon, a second delta circuit each arm of which includes a pair of potentiometers each provided with an adjustable slider, each apex junction of said second delta circuit having a respective one of the others of each of said pairs of phase splitter output signals impressed thereon, an output channel for each of the composite colors, an adding circuit inserted in and connected to each output channel, each respective adding circuit having impressed on its input the potentials of the sliders of the first and second delta circuits which are adjacent the respective apex junctions to which one or the other of the pair of output signals of a particular phase splitter is applied, electrically diametrically opposed sliders of the potentiometers of said delta circuits being connected for conjoint operation in pairs.

7. A television color masker for correcting the colors in separate red, green, and blue signal channels of a color television system comprising, means individual to each channel for producing therefrom a pair of color output signals of equal amplitude but opposite phase, each pair of signals corresponding in color to the channel from which they are derived, a first closed delta circuit each arm of which includes a pair of potentiometers connected in series, each potentiometer being provided with an adjustable slider electrically diametrically opposed pair of which are interconnected for conjoint operation in the same direction each individual apex junction of said first delta circuit having a different color but like phased color output signal impressed thereon, a second closed delta circuit each arm of which includes a pair of potentiometers connected in series, each potentiometer being provided with an adjustable slider electrically diametrically opposed pairs of which are interconnected for conjoint operation in opposite directions each individual apex junction of said second delta circuit having impressed thereon a different color output signal opposite in phase to those impressed on said first delta circuit, a first adding circuit summing the potentials of the sliders of the potentiometers electrically adjacent those apex junctions of said first and second delta circuits on which the red color output signals are impressed, a red corrected output channel connected to the output of said first adding circuit, a second adding circuit summing the potentials of the sliders of the potentiometers electrically adjacent those apex junctions of said first and second delta circuits on which a green color output signal is impressed, a green corrected output channel connected to the output of said second adding circuit, a third adding circuit summing the potentials of the sliders of the potentiometers electrically adjacent those apex junctions of said first and second delta circuits on which the blue color output signals are impressed, and a blue corrected output channel connected to the output of said third adding circuit.

No references cited.